(12) United States Patent
Blanchard et al.

(10) Patent No.: US 7,892,375 B2
(45) Date of Patent: Feb. 22, 2011

(54) ROTARY ULTRASONIC SEALING

(75) Inventors: Daniel Blanchard, Neuvy-en-Sullias (FR); David Wicks, Hampshire (GB); Michel Montoya, Steimbourg (FR)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 12/516,302

(22) PCT Filed: Nov. 26, 2007

(86) PCT No.: PCT/GB2007/004512
§ 371 (c)(1),
(2), (4) Date: Jun. 3, 2010

(87) PCT Pub. No.: WO2008/065365
PCT Pub. Date: Jun. 5, 2008

(65) Prior Publication Data
US 2010/0243172 A1  Sep. 30, 2010

(30) Foreign Application Priority Data
Nov. 27, 2006  (GB) ................................. 0623648.3

(51) Int. Cl.
*B32B 37/00* (2006.01)
(52) U.S. Cl. .................... 156/73.1; 156/553; 156/580.1; 156/580.2
(58) Field of Classification Search ................ 156/73.1, 156/553, 555, 580, 580.1, 580.2, 582; 264/442–445; 425/174.2
See application file for complete search history.

(56) References Cited
U.S. PATENT DOCUMENTS 3,939,033 A * 2/1976 Grgach et al. ............... 156/515
3,993,532 A * 11/1976 McDonald et al. ......... 156/580.2
4,032,378 A * 6/1977 McDonald et al. ............. 216/8
4,430,148 A * 2/1984 Schaefer ................... 156/580.2

(Continued)

FOREIGN PATENT DOCUMENTS

DE  3301586 A1  7/1984

(Continued)

OTHER PUBLICATIONS

International Search Report issued Dec. 3, 2008 during the prosecution of International Application No. PCT/GB2007/004512.

(Continued)

*Primary Examiner*—James Sells
(74) *Attorney, Agent, or Firm*—Fulbright & Jaworski, LLP

(57) ABSTRACT

The invention is an apparatus for forming an ultrasonic weld that includes a sonotrode having an ultrasonic actuator coupled to an elongate sealing end face for delivering ultrasonic energy to the webs in the sealing gap and a rotating cylindrical anvil having at least one raised portion extending longitudinally along an outer surface thereof. The raised portion has a radially outer surface, whereby the sealing gap is defined intermittently between the end face of the sonotrode and the radially outer surface of the raised portion of the anvil as the raised portion rotates past the end face of the sonotrode. The elongate sealing end face of the sonotrode has a substantially helical surface, whereby the sealing gap travels helically along the surface as the raised portion of the anvil cylinder rotates past the end face of the sonotrode.

10 Claims, 2 Drawing Sheets

U.S. PATENT DOCUMENTS

| | | | |
|---|---|---|---|
| 4,531,999 A | | 7/1985 | Persson et al. |
| 4,704,172 A | | 11/1987 | Katz |
| 6,149,755 A | * | 11/2000 | McNichols et al. ......... 156/264 |
| 6,165,298 A | * | 12/2000 | Samida et al. ............. 156/73.1 |
| 6,517,671 B2 | * | 2/2003 | Couillard et al. ......... 156/580.2 |
| 6,824,632 B2 | | 11/2004 | Blanchard et al. |
| 7,341,084 B2 | * | 3/2008 | Van Eperen ................. 156/510 |

FOREIGN PATENT DOCUMENTS

| | | |
|---|---|---|
| EP | 1477293 A2 | 11/2004 |
| WO | 9721535 A1 | 6/1997 |
| WO | 0020191 A1 | 4/2000 |
| WO | 2004008659 A1 | 1/2004 |

OTHER PUBLICATIONS

Written Opinion issued Dec. 3, 2008 during the prosecution of International Application No. PCT/GB2007/004512.

International Preliminary Report on Patentability issued Dec. 3, 2008 during the prosecution of International Application No. PCT/GB2007/004512.

Search Report under Section 17 issued Feb. 9, 2007 during the prosecution of Application No. GB0623648.3.

* cited by examiner

FIG. 3 (Comparative)
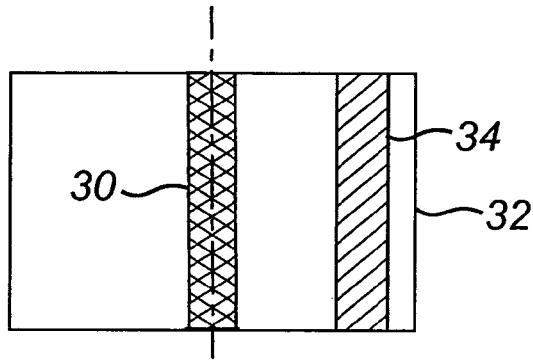
FIG. 4 (Comparative)
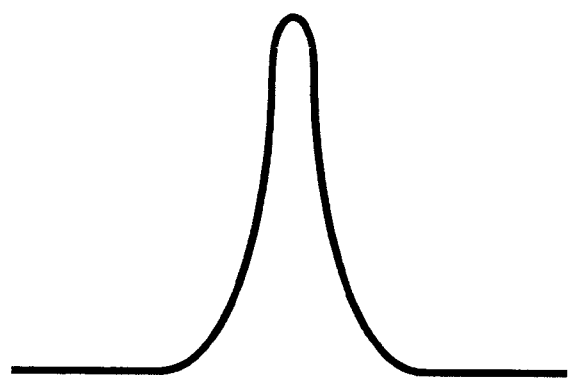
FIG. 5
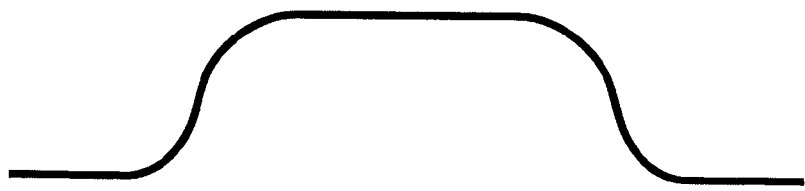

ROTARY ULTRASONIC SEALING

CROSS-REFERENCE TO RELATED APPLICATIONS

This application is a national stage filing of PCT/GB2007/004512 filed Nov. 26, 2007 which claims priority from Application 0623648.3 filed on Nov. 27, 2006 in the United Kingdom.

TECHNICAL FIELD

The present invention relates to an apparatus and method for rapidly creating transverse seals between at least two superimposed flexible webs of sheet material, by using ultrasonic energy to bond the flexible webs together.

BACKGROUND OF THE INVENTION

It is known to use ultrasonic devices for creating a sealing joint between two or more flexible webs of sheet material. Such procedures can be used during the manufacture of packets for packaging materials therein. See, for example, U.S. Pat. No. 6,824,632. This document discloses a sonotrode and an opposed anvil. The webs to be joined together are passed between them in an aligned manner to compress the webs together, and at desired positions, the webs are then sealed together by activating the sonotrode to impart ultrasonic energy. See also WO-A-2004/000659, which discloses an apparatus that operates in a similar manner, having a rotating anvil (a roller) to help move the webs through the apparatus.

One development of the sonotrode/rotating anvil arrangement, such as that disclosed in WO-A-2004/000659, is illustrated in FIGS. 1 and 2. That development is to provide raised portions around the circumference of the roller anvil. They provide distinct areas of the roller against which the sonotrode can compress webs of material for welding those webs of material together. In this manner, switching on and switching off of the sonotrode between welds becomes less important since webs passing between the roller and the sonotrode will only be welded when compressed between a raised portion of the roller and the sonotrode. Therefore the sonotrode can be continuously driven by its ultrasonic actuator. This allows faster throughput. However, difficulties arise even with this arrangement. First of all, the maximum rotation speed of the rollers is governed by the available power of the sonotrode, and the demands on that sonotrode are rather high since the entire weld across and through the webs must be formed at substantially the same time. However, there is a limit as to how much ultrasonic energy can be delivered by a sonotrode actuator. Therefore, to prevent incomplete welds being formed across and through the webs as the webs pass between the sonotrode and a raised portion of the roller, it is necessary to limit how fast the roller is rotated. If the roller rotates too quickly, then each weld would be incomplete, i.e. a reliable seal would not be achieved because insufficient energy was delivered to the web during the short time that the weld line is located between the sonotrode and the raised portion of the roller. Secondly, due to the high demands that the raised portions place on the sonotrode, the loading profile for the sonotrode has significant spikes—see FIG. 4, whereby its working life can be inconveniently short.

It would be desirable, therefore, further to increase the throughput of ultrasonic web welding devices, whereby reduced manufacture times and/or increased production rates can be achieved.

BRIEF SUMMARY OF THE INVENTION

The present invention provides an apparatus for forming an ultrasonic weld at least partially across, and between, two or more webs of sheet material as they pass through a sealing gap in the apparatus, the apparatus comprising: a sonotrode comprising an ultrasonic actuator coupled to an elongate sealing end face for delivering ultrasonic energy to the webs in the sealing gap; and a rotating cylindrical anvil having at least one raised portion extending longitudinally along an outer surface thereof, said raised portion having a radially outer surface, whereby said sealing gap is defined intermittently between the end face of the sonotrode and the radially outer surface of the raised portion of the anvil as the raised portion rotates past the end face of the sonotrode, characterised in that: the elongate sealing end face of the sonotrode has a substantially helical surface, whereby the sealing gap travels along said helical surface as the raised portion of the anvil cylinder rotates past the end face of the sonotrode.

The present invention also provides a method of welding a first web of sheet material to a second web of sheet material comprising the steps of: providing an ultrasonic welding apparatus according to the invention; rotating the anvil while feeding the webs to be sealed through the gap between the anvil and the sonotrode sealing end face in a direction substantially perpendicular to the axis of rotation of the anvil; and actuating the sonotrode to form seals in the webs substantially transverse to the direction of motion of the web, wherein the speed of rotation of the anvil and the speed of feeding of the webs are selected to produce said transverse seals at predetermined intervals in the web.

The helical configuration of the end face of the sonotrode allows the ultrasonic welding to be spread over a longer period of time for a given speed of rotation of the anvil, since only a region of the sonotrode's end face is in compressive contact with the raised portion of the anvil and the web at any given instant as the anvil raised portion rotates past the end face. The ultrasonic energy delivered by the sonotrode is concentrated in this region, resulting in rapid welding of the web in this region. The region of contact progressively moves along the sonotrode helix, and thereby across the width of the webs, as the anvil rotates as and the webs continue to move laterally relative to the end face of the sonotrode. In this way, the ultrasonic welding region sweeps across the web, to produce the transverse seal. The use of the helical sealing surface on the sonotrode enables the sealing time to be spread out over a broader range of angular positions of the rotating anvil, thereby allowing more total sealing energy to be delivered for a given sonotrode power and rotation rate of the anvil. In practice, this means that the process can be run faster (i.e. faster rotation of the anvil and faster web feed rate) for a given sonotrode power. Typically, the process can be run from about 2 to about 10 times faster than a process of the type described in WO-A-00/20191 or WO-A-2004/000659 that uses a simple transverse sealing surface on the sonotrode.

The helical end surface of the sonotrode suitably has a helix radius slightly greater than the radius of the rotating anvil (i.e. equal to the radius of the raised portions of the anvil plus the thickness of the sealing gap. Suitably, the pitch of the helix is selected such that the circumferential distance between the ends of the helix is from about 1 to about 5 times the mean circumferential width of the sealing end face as measured around the circumference of the helix.

The apparatus suitably further comprises a web feeding mechanism for feeding the webs to be sealed through the sealing gap. Suitably, the webs are fed at a speed such that the helical movement of the sealing region along the sealing gap generates a transverse seal across the moving web that is substantially linear and perpendicular to the direction of motion of the web. Typical web feeding rates are from about 20 m/min to about 60 m/min. Typical sealing rates are from about 200 transverse seals per minute to about 1000 transverse seals per minute, for example from about 300 to about 600 transverse seals per minute.

In certain embodiments, the width of the end face of the sonotrode and/or of the raised region of the anvil cylinder (measured substantially perpendicular to the axis of rotation of the cylinder, i.e. in the direction of the web feed) is substantially constant along its length. These embodiments are used to produce seals of substantially constant width across the web. In other embodiments, the width of the end face of the sonotrode and/or of the raised region of the anvil cylinder is not constant along its length, whereby seals having varying widths along their length can be produced. Suitably, the mean width of the sonotrode end face (measured around the circumference of the helix), is from about 10 mm to about 60 mm.

In certain embodiments, the height of the sonotrode end face and/or of the raised portion of the anvil cylinder is not constant along its length, whereby the thickness of the sealing gap defined between the sonotrode end face and the raised portion of the roller is not constant along the length of the sealing face. These configurations are useful to form seals in webs having varying thickness across their width. For example, the web may comprise a folded portion or inserted gusset portion in one edge thereof, whereby the thickness of the web in the gusset region is approximately double the thickness of the remainder of the web. Webs incorporating such a gusset fold are described, for example, in WO-A-2004/000656. This variation in thickness can be accommodated for optional sealing of both portions by the use of a profiled sonotrode end face.

Suitably, the sonotrode end face and the anvil raised portion are configured such that the sealing gap is tapered in the direction of travel of the web such that the gap is wider at the entry point of the web and narrower at the exit point of the web. That is to say, the web facing surface of either the sonotrode (the end face) or the anvil, and the raised portions of the rotating anvil is angled relative to the direction of travel of the webs such that the distance between the anvil surface and the end face tapers in the lateral direction (i.e. in the direction of passage of the webs through the gap). Tapered sealing gaps of this type are described in detail in WO-A-00/20191. This tapered sealing gap allows the weld to be progressively passed deeper through the material of the webs as the webs pass further through the gap (between the end face and the anvil), and also ensures that the webs are compressed sufficiently together for the weld to provide a secure seal between the webs. The mean thickness of the sealing gap is typically from about 100 micrometers to about 700 micrometers, depending on the thickness of the web to be sealed.

The inlet gap between the sonotrode and the anvil is typically larger than the exit by a factor between 1.2 and 3.

Preferably, the sonotrode is actuated substantially continuously. In an alternative embodiment, the sonotrode may run discontinuously, being briefly activated for performing a weld across and between the webs as the webs pass between the sonotrode and the anvil, and then is briefly deactivated between sealing operations. The sonotrode suitably vibrates at a frequency in the range of from 20 kHz to about 40 kHz, with an amplitude of from about 10 micrometers to about 100 micrometers, for example from about 40 micrometers to about 80 micrometers. In certain embodiments, the sonotrode is coupled with a ram or counterweight so that is exercises a specific pressure of from about $10^5$ to $10^7$ Pa on the webs in the sealing gap, for example about $0.2 \times 10^5$ to about $6 \times 10^5$ Pa on the webs.

Preferably the anvil roller has two or more substantially identical raised portions around its circumference. More preferably there are from 4 to 20 such portions, for example from 5 to 10 of the raised portions.

Each raised portion may simply define a straight ridge extending straight across the anvil (i.e. substantially parallel to the axis of rotation of the roller). It will then form a weld line across the width of the webs. Alternatively, more complex weld designs can be created by providing different shapes for the raised portions and the sonotrode sealing surface.

For a roller featuring more than one raised portion around its circumference, preferably the substantially identical raised portions are equally spaced around that circumference of the roller and have substantially identical configurations.

Suitably, the apparatus further comprises one or more setting rollers, configured to apply a light compression to the sealed web after it has exited the sonotrode gap in order to aid fusion between the web layers during cooling. The roller has the benefit of improving weld homogeneity and strength, particularly for non-woven materials such as filter materials used inside beverage sachets. The setting rollers are normally coaxial with the rotating anvil. The compression is typically applied between an outer surface of the setting roller and one of the raised portions on the rotating anvil. The setting roller is preferably located as close as possible to the sonotrode gap. Two or more setting rollers may be spaced circumferentially around the rotating anvil to apply compression sequentially to the web.

BRIEF DESCRIPTION OF THE DRAWINGS

An embodiment of the present invention will now be described in greater detail, purely by way of example, with reference to the accompanying drawings in which:

FIG. 3 shows a view similar to that of FIG. 2 of a sonotrode end face according to the prior art;

FIG. 4 shows a graph of energy transfer against time for sealing with a sonotrode head according to the prior art as shown in FIG. 3; and FIG. 5 shows a graph of energy transfer against time for sealing with a sonotrode head according to the invention as shown in FIGS. 1 and 2.

DETAILED DESCRIPTION OF THE INVENTION

Figure 1:
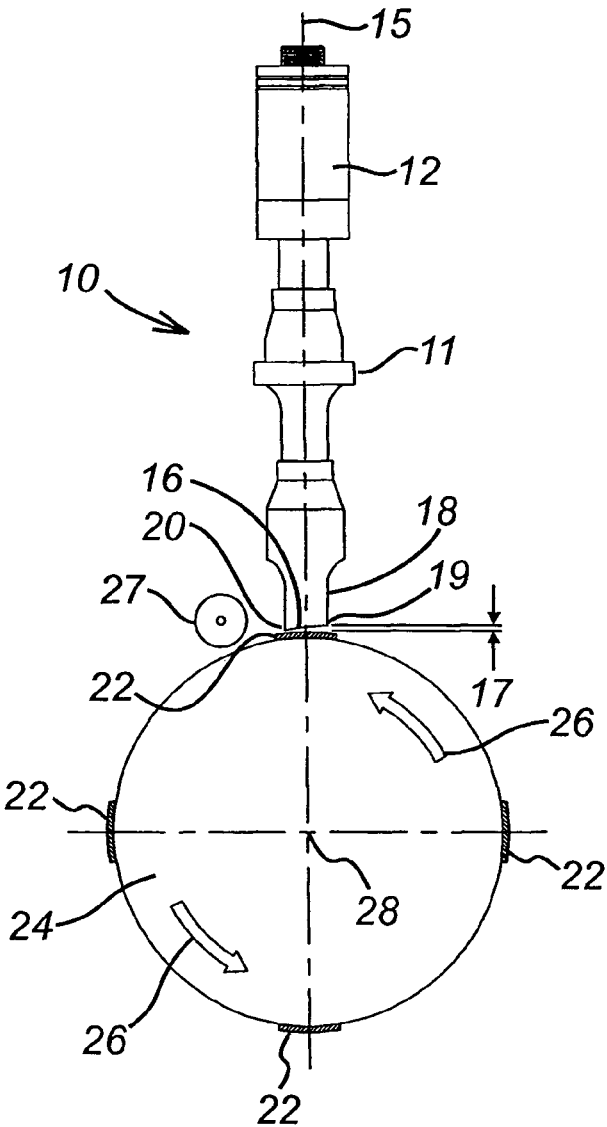
FIG. 1 illustrates a schematic view in side elevation of a sonotrode/anvil arrangement according to the present invention.

Referring to FIG. 1, the apparatus comprises a sonotrode assembly 10 and a rotating anvil 24. The sonotrode assembly 10 comprises an ultrasonic actuator 12 that is coupled to a booster or number of boosters 11 coupled to sonotrode head 18. The sonotrode head 18 has an elongate, profiled sealing end face 16 that faces the rotating anvil 24. The anvil 24 comprises a roller provided with four raised portions 22 of substantially constant width (measured along the circumference of the anvil) and height (measured radially from the center of the roller) extending along its outer surface parallel to the axis of rotation 28 of the anvil. In the configuration shown in the drawing, it can be seen that a sealing gap 17 is intermittently defined between the sonotrode end face 16 and the outer surface of each raised portion 22 of the roller anvil.

The end face 16 is profiled to provide a sealing gap 17 between the sonotrode and the anvil 24. The end face 16 of the sonotrode is profiled such that the sealing gap 17 is tapered, whereby it is relatively wider at the edge 19 at which the webs to be sealed enter, and tapers to a relatively narrower gap at the edge 16 at which the sealed webs exit the sealing gap.

Figure 2:
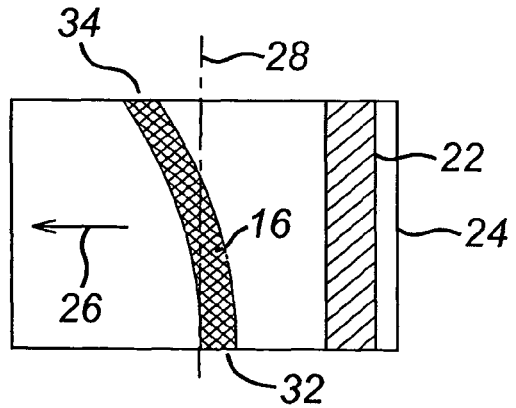
FIG. 2 schematically illustrates a plan view of the end face of the sonotrode and the rotating anvil in the assembly of FIG. 1.

In addition to the taper profiling described above, the end face 16 of the sonotrode assembly is helically profiled as shown in FIG. 2. Unlike prior art sealing apparatus, the elongate end face 16 of the sonotrode does not extend linearly, parallel to the axis of the roller 22. Instead, the elongate end face curves slightly around the sealing roller, following a helical path having an axis coincident with the axis 28 of the roller such that the first end 32 of the elongate end face is located at a different circumferential position relative to the roller than the second end 34 of the elongate end face. The extent of the circumferential displacement of the second end is approximately twice the width of the end face.

The rotating anvil 24, in use, rotates about its central axis 28, whereby the four raised portions 22 are rotated past the end face 16 of the sonotrode 10 in close proximity thereto. Thus they will each intermittently form a compression surface to compress together the webs of sheet material that are passing through the gap 17 by compressing them against the end face 16 of the sonotrode 10. Then, provided that the sonotrode 10 is vibrating ultrasonically (usually along its axis 15), and with sufficient power and amplitude for the purpose, given the materials of the webs, and provided the roller is not rotating too quickly, the webs will be welded together within the gap 17. In this illustrated embodiment, as shown by the two arrows 26 the roller 24 rotates anti-clockwise.

The raised portions 22 and the rotating roller 24 are arranged within the welding apparatus such that the webs will pass through the gap 17 at the same speed, and in registration with, the outer surface of the roller 24. For that purpose, the roller 24 may be driving the webs forward. More preferably, however, the roller 24 simply follows the webs, with separate web driving means (not shown) being provided for the webs. Such drive means are known, for example, from WO2004/000656.

With this arrangement, the end face 16 will only intermittently be welding the webs—when the webs are compressed against the end face 16 by a raised portion 22 of the roller anvil 24. Thus, the welds are intermittently spaced along the length of the webs.

In the illustrated embodiment, the end face 16 of the sonotrode subtends a narrower circumferential arc than the raised portions 22 of the rotating anvil. However, that also might be altered, such as by providing a wider end face 16 or a narrower raised portion.

The sealing end face 16 of the sonotrode 10 extends across the full width of the rotating anvil 24, and hence across the full width of the webs to be sealed. It can be seen that, as the raised portion 22 on the roller rotates past the sealing face 16, sealing will start at the first end 32 of the face 16, and end at the second end 34 of the end face once the webs have progressed further through the gap 17. Given appropriate synchronisation of the web feed rate with the roller rotation speed, this will result in a seal that extends in a substantially straight line across the web.

The helical profiling of the sonotrode sealing end face 16 therefore extends the period of time taken to perform a weld across the full width of a webs, and concentrates the sealing energy at any given instant in a small region of the webs, not across the whole width of the webs. It can be seen that, in the illustrated embodiment, the total sealing period is extended by approximately a factor of 3 for a given rotation speed as compared to the prior art arrangement of FIG. 2. This can be seen from the offsets of the ends 32, 34 relative to the central axis 28 of the roller 24 shown in FIG. 2.

As a result of both the tapered gap 17 and the helical orientation of the end face 16, therefore, the present invention will smooth the loading profile of the sonotrode as shown in FIG. 5, which is a graph of sealing energy delivered to the webs versus time.

The tapered configuration of the sealing gap 17 increases the contact time between the raised portion 22 and the end face 16 of the sonotrode 10 since as the weld forms, the material of the webs will tend to shrink. The taper therefore further ensures a complete and reliable weld is achieved.

The width 19 of the sealing end face 16 of the sonotrode in this embodiment is such that the end face 16 subtends around a circumferential arc of about 10° of the roller 24. If desired, however, the end face 16 can be made wider or narrower, whereby a wider or narrower arc of the roller is covered. This can provide additional or less time for welding, as might be needed for different materials. Similarly, the rotational speed of the roller can be varied (e.g. by moving the webs slower or faster through the gap 17) to the same effect.

The apparatus according to this embodiment further comprises a setting roller 27, which is configured to apply a light compression to the sealed web after it has exited the sonotrode gap in order to aid fusion between the web layers during cooling.

FIG. 3 shows a view similar to that of FIG. 2, for a comparative apparatus having a sonotrode end sealing face 30 extending linearly across a rotating anvil 32 having raised portions 34 similar to the rotating anvil of FIG. 1. The apparatus operates in similar fashion to the apparatus of FIG. 1, but it will readily be appreciated that for a given rotation speed of the anvil the total contact time between the sealing region 34 and the sonotrode head 30 is reduced relative to the inventive embodiment of FIGS. 1 and 2, and the sealing energy supplied by the sonotrode is distributed along the whole length of the sealing face 30. Hence the sealing energy per unit length of the seal is reduced. In practice the power output of the sonotrode actuator is limited, and hence the speed of the anvil rotation must be reduced to achieve satisfactory sealing with the apparatus of FIG. 3. FIG. 4 shows a graph of sealing energy delivered against time for an apparatus of the type shown in FIG. 3.

The above embodiment has been described purely by way of example. It should be noted that modifications in detail may be made within the scope of the invention as defined in the claims appended hereto.

What is claimed is:

1. An apparatus for forming an ultrasonic weld at least partially across, and between, two or more webs of sheet material as they pass through a sealing gap in the apparatus, the apparatus comprising:

a sonotrode comprising an ultrasonic actuator coupled to an elongate sealing end face for delivering ultrasonic energy to the webs in the sealing gap; and a rotating cylindrical anvil having at least one raised portion extending longitudinally along an outer surface thereof, said raised portion having a radially outer surface, whereby said sealing gap is defined intermittently between the end face of the sonotrode and the radially outer surface of the raised portion of the anvil as the raised portion rotates past the end face of the sonotrode;

wherein the elongate sealing end face of the sonotrode has a substantially helical surface, whereby the sealing gap travels helically along said surface as the raised portion of the anvil cylinder rotates past the end face of the sonotrode.

2. The apparatus of claim 1, further comprising a web feeding mechanism for feeding the webs to be sealed through the sealing gap at a speed such that the helical movement of the sealing gap generates a transverse seal across the moving web that is substantially linear and perpendicular to the direction of motion of the web.

3. The apparatus of claim 1, wherein the width of the end face of the sonotrode and/or of the raised region of the anvil cylinder is not constant along its length, whereby seals having varying widths along their length can be produced.

4. The apparatus of claim 1, wherein the sonotrode end face and/or the anvil raised portion are configured such that the sealing gap is tapered in the direction of travel of the webs such that the gap is wider at an entry point of the webs into the gap and narrower at an exit point of the webs.

5. The apparatus of claim 1, wherein the height of the end face of the sonotrode and/or of the raised portion of the rotating anvil, measured from the axis of rotation of the anvil, is not constant along its length, whereby seals can be formed in webs having varying thicknesses along their width.

6. The apparatus of claim 1, wherein the pitch of the helical sealing end face of the sonotrode is such that a first end of the sealing end face is displaced circumferentially from a second end of the sealing end face by a distance of from about 1 to about 5 times the circumferential width of the sealing end face.

7. The apparatus of claim 6, wherein a plurality of said raised sealing regions are circumferentially spaced around the rotating anvil.

8. The apparatus of claim 1, wherein the apparatus further comprises one or more setting rollers, configured to apply a compression to the sealed web after it has exited the sonotrode gap in order to aid fusion between the web layers during cooling.

9. A method of welding a first web of sheet material to a second web of sheet material comprising the steps of:
providing an ultrasonic welding apparatus according to claim 1;
rotating the anvil while feeding the webs to be sealed through the gap between the anvil and the sonotrode sealing end face in a direction substantially perpendicular to the axis of rotation of the anvil; and
actuating the sonotrode to form seals in the webs substantially transverse to the direction of motion of the web,
wherein the speed of rotation of the anvil and the speed of feeding of the webs are selected to produce said transverse seals at predetermined intervals in the web.

10. The method according to claim 9, wherein the webs to be sealed are fed through the sealing gap at a speed such that the helical movement of the sealing gap generates a transverse seal across the moving web that is substantially linear and perpendicular to the direction of motion of the web.

* * * * *